United States Patent Office 2,866,678
Patented Dec. 30, 1958

2,866,678

1-AMINO-2-NITROBENZENE-4-SULFONIC ACID AMIDES

Ernst Merian, Allschwil, Switzerland, assignor, by mesne assignments, to Saul & Co., Newark, N. J., as nominee of Fidelity Union Trust Company, executive trustee under Sandoz Trust No Drawing. Application February 21, 1955
Serial No. 489,771

Claims priority, application Switzerland February 22, 1954

5 Claims. (Cl. 8—57)

Only a few disperse dyestuffs are known which dye acetate rayon in yellow shades having sufficient fastness to withstand washing at elevated temperatures without undergoing change of shade or bleeding on adjacent material. The affinity of these dyestuffs for acetate rayon, however, is insufficient.

The present invention relates to disperse dyestuffs which have good affinity for acetate rayon. They dye this fiber in reddish yellow shades of very good fastness to washing and excellent fastness to light and to gas fumes. The dyestuffs are water-insoluble derivaties of 1-amino-2-nitrobenzene-4-sulfonic acid amide and correspond to the formula

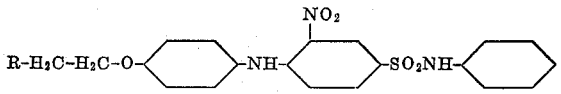

wherein —R is —OH or —O—CH$_2$—CH$_2$—O—CH$_3$.

The aforesaid derivatives of 1-amino-2-nitrobenzene-4-sulfonic acid amide are obtained by reacting 1 mol of a 1-halogen-2-nitrobenzene-4-sulfonic acid amide which corresponds to the formula

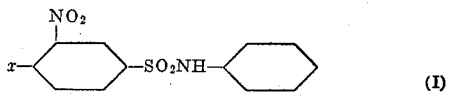

wherein $x$ stands for chlorine or bromine, with 1 mol of an amine of the formula

wherein R is as precedingly defined.

The reaction of the 1-halogen-2-nitrobenzene-4-sulfonic acid amides of the Formula I with the amines of the Formula II is best conducted at elevated temperatures. Water is an excellent reaction medium; a wetting agent may be added, or alternatively an organic solvent, e. g. ethanol, benzyl alcohol, benzene, toluene, etc. An addition of a suitable acid-binding agent such as sodium acetate, sodium carbonate or sodium bicarbonate has a favourable influence on condensation in most cases. The same effect is achieved with an excess of the appropriate amine or amines.

The 1-halogen-2-nitrobenzene-4-sulfonic acid amides used as starting materials for performing this invention can be produced by the recognized methods, i. e. by treating 1-halogen-2-nitrobenzene-4-sulfonic acid halides with phenylamine under mild conditions. The 1-chloro-2-nitrobenzene-4-sulfonic acid-phenylamide e. g. has a melting point of 85° C.

The following examples illustrate the invention without in any way limiting its scope. The proportions refer to parts by weight; temperatures are in degrees centigrade.

Example 1

21.5 parts of 1-amino-4-[2'-(2''-methoxy)-ethoxy]-ethoxybenzene, 31.2 parts of 1-chloro-2-nitrobenzene-4-sulfonic acid phenylamide and 8.4 parts of sodium bicarbonate are stirred into 40 parts of water. The emulsion thus obtained is heated to boiling point and stirred for 2 hours at this temperature. Upon cooling the product separates from the mass; it is then filtered and washed, first with water and then with a little ethanol. The new yellow dyestuff may be crystallized from four times its weight of ethanol, from which it separates in needles having a melting point of 114°. It corresponds to the formula

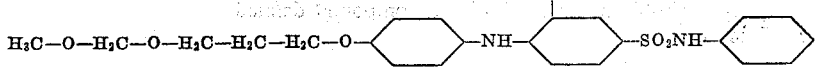

When converted into a dye preparation in the normal manner, it dyes acetate rayon and synthetic polyamide fibers from aqueous dispersion in reddish yellow shades which are fast to light and subliming. Dyeings on acetate rayon are specially noteworthy for their outstanding fastness to washing. Thus they withstand treatment in an equeous solution containing 0.5% soap and 0.2% soda for 45 minutes at 71° (Wash Test No. 3, 1953 Technical Manual and Year Book of the American Association of Textile Chemists and Colorists, pages 91–92) without undergoing change of shade or bleeding onto adjacent acetate and viscose rayon.

Example 2

10.4 parts of 1-chloro-2-nitrobenzene-4-sulfonic acid phenylamide and 6 parts of 1-amino-4-(2'-hydroxy)-ethoxybenzene are stirred into 50 parts of water. The suspension is heated to boiling point, 3 parts of sodium bicarbonate added in portions, and the whole stirred for 4 hours at 90–100°. The dyestuff gradually separates out in solid form and after cooling the mass is removed by filtration. After washing and drying, a yellow-brown powder is obtained which can be crystallized to form orange colored needles having a melting point of 140°. It corresponds to the formula

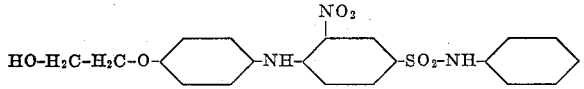

When converted into a dye preparation in the normal way, the new dyestuff dyes acetate rayon from aqueous dispersion in reddish yellow shades which are fast to light and subliming. The dyeings are characterized by very good fastness to washing.

Example 3

A dyebath is prepared with 0.6 part of the dyestuff obtained according to Example 1 and dispersed with the aid of Turkey red oil, 6 parts of a sulfonated fatty alcohol and 3000 parts of water. 100 parts of acetate rayon are entered at room temperature, the bath raised to 80° within 1 hour and maintained at this level for another hour, at which time the dyeing process is completed. On removal the goods are rinsed and dried. To improve the dispersion, the dyestuff can be ground prior to dyeing with suitable wetting, dispersing and emulsifying agents, and preferably in the presence of inorganic salts, e. g. Glauber salt. It can also be intimately mixed in aqueous paste Having thus disclosed the invention what is claimed is:

1. A 1-amino-2-nitrobenzene-4-sulfonic acid amide which corresponds to the formula

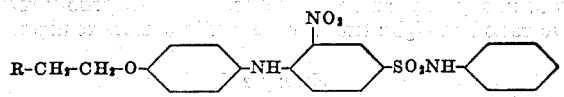

wherein —R is a member selected from the group consisting of hydroxy and methoxyethoxy.

2. The 1-amino-2-nitrobenzene-4-sulfonic acid amide which corresponds to the formula

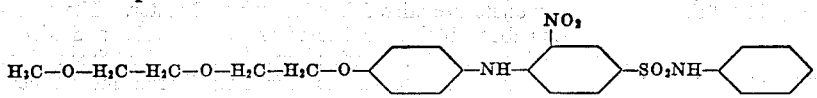

3. The 1-amino-2-nitrobenzene-4-sulfonic acid amide which corresponds to the formula

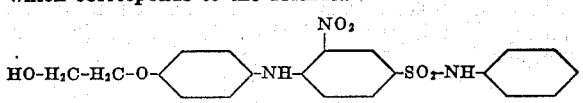

4. Hydrophobic fibers dyed with a compound defined in claim 1.

5. Acetylcellulose dyed with a compound defined in claim 1.

References Cited in the file of this patent
UNITED STATES PATENTS

| | | |
|---|---|---|
| 2,221,131 | Fischer et al. | Nov. 12, 1940 |
| 2,422,029 | McNalley et al. | June 10, 1947 |
| 2,466,010 | Dickey et al. | Apr. 5, 1949 |
| 2,466,011 | Dickey et al. | Apr. 5, 1949 |
| 2,506,224 | Kopp et al. | May 2, 1950 |

FOREIGN PATENTS

| | | |
|---|---|---|
| 669,031 | Germany | Dec. 15, 1938 |

OTHER REFERENCES

Fischer: Berichte der Deut., vol. 24 (1891), pages 3793–95.
Webster et al.: J. A. C. S, vol. 63 (1941), page 1928.
Northey: The Sulfonamides and Allied Compounds, 1948, pages 246, 247.